US007698648B2

(12) United States Patent
Rollin et al.

(10) Patent No.: US 7,698,648 B2
(45) Date of Patent: Apr. 13, 2010

(54) ANIMATION OF ICONS BASED ON PRESENCE (75) Inventors: Kelly E. Rollin, Seattle, WA (US); Ankur Chavda, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 204 days.

(21) Appl. No.: 11/552,044

(22) Filed: Oct. 23, 2006

(65) Prior Publication Data

US 2008/0098328 A1 Apr. 24, 2008

(51) Int. Cl.
*G06F 3/00* (2006.01)
(52) U.S. Cl. .................. 715/758; 715/859; 715/861; 715/967; 715/977
(58) Field of Classification Search .......... 715/861, 715/758, 977, 967, 859
See application file for complete search history.

(56) References Cited

U.S. PATENT DOCUMENTS

| | | | |
|---|---|---|---|
| 6,507,845 B1 | 1/2003 | Cohen et al. | |
| 6,829,585 B1 | 12/2004 | Grewal et al. | |
| 7,035,865 B2 | 4/2006 | Doss et al. | |
| 2002/0116336 A1 | 8/2002 | Diacakis et al. | |
| 2002/0156902 A1 | 10/2002 | Crandall | |
| 2003/0046296 A1* | 3/2003 | Doss et al. | 707/102 |
| 2003/0070176 A1 | 4/2003 | Parker et al. | |
| 2003/0210265 A1* | 11/2003 | Haimberg | 345/758 |
| 2004/0266468 A1 | 12/2004 | Brown et al. | |
| 2005/0165920 A1 | 7/2005 | Kerr et al. | |
| 2006/0031516 A1 | 2/2006 | Kumer | |
| 2006/0041581 A1 | 2/2006 | Aghvami et al. | |
| 2006/0053379 A1 | 3/2006 | Henderson et al. | |
| 2007/0094335 A1* | 4/2007 | Tu | 709/206 |

FOREIGN PATENT DOCUMENTS

EP 1670198 A2 6/2006

OTHER PUBLICATIONS

Schmidt et al., "Mobile Phone as Tool to Increase Communication and Location Awareness of Users", Oct. 25-27, 2006, ACM, Mobility 06, pp. 1-7.*
Schummer et al., "The Absent Participant", Oct. 21-23, 2006, ACM, PLoP 06, pp. 1-14.*
De Guzman, Edward S. et al., "Exploring the Design and Use of Peripheral Displays of Awareness Information," CHI 2004, Apr. 24-29, 2004, Vienna, Austria, pp. 1247-1250.
Hibino, Stacie and Audris Mockus, "handiMessenger: Awareness-Enhanced Universal Communication for Mobile Users," Human Computer Interaction Consortium 2002 Winter Workshop.
Hofte, G. Henri ter, "Place-based presence as a basis for ad-hoc communication," ECSCW 2001 Workshop on Ad hoc Communications, Bonn, Germany, Sep. 16, 2001, http://www.scs.carleton.ca/~barbeau/wadhc/Papers/hofte.pdf, [last accessed Aug. 24, 2007].
Tran, Minh Hong et al., "Supporting Awareness in Instant Messaging: An Empirical Study and Mechanism Design," Proceedings of OZCHI 2005, Canberra, Australia, Nov. 23-25, 2005.

* cited by examiner

*Primary Examiner*—Boris Pesin
*Assistant Examiner*—Shen Shiau
(74) *Attorney, Agent, or Firm*—Perkins Coie LLP

(57) ABSTRACT

A method and system for indicating availability of a contact is provided. The presence system displays to the user an indication of the presence state in association with the contact. The presence system provides an indication of the availability associated with the presence state of the contact when the user indicates to view such information. When the contact has high availability, the presence system displays an increasing animation. When the contact has low availability, the presence system displays a decreasing animation.

19 Claims, 8 Drawing Sheets

ANIMATION OF ICONS BASED ON PRESENCE

BACKGROUND

Users of computing devices (e.g., laptops, cellular phones, and personal digital assistants) often need to communicate in real time. A common form of real-time communications is provided by instant messaging services. An instant messaging service allows participants at endpoints to send messages and have them received within a second or two by the other participants in a conversation. The receiving participants can then send responsive messages to the other participants in a similar manner. To be effective, a real-time conversation relies on the participants' becoming aware of, reviewing, and responding to received messages very quickly. This quick response is in contrast to conventional electronic mail systems in which the recipients of electronic mail messages respond to messages at their convenience.

When an initiating participant wants to start a real-time conversation, that participant needs to know whether the intended participants are available to respond in real time to a message. If not, then communications via conventional electronic mail, voice mail, or some other mechanism may be more appropriate. For example, if the computers of the intended participants are currently powered off, then a real-time conversation may not be possible. Moreover, if their computers are currently powered on, but the intended participants are away from their computers, a real-time conversation is also not possible. The initiating participant would like to know the availability of the intended participants so that an appropriate decision on the form of communication can be made.

Presence services provide this availability information. The availability status of an entity such as a computer system or a user associated with that computer system is referred to as "presence information." Presence information identifies the current "presence state" of the user. Users make their presence information available to a presence service so that other users can decide how best to communicate with them. For example, the presence information may indicate whether a user is logged on ("online") with an instant messaging service or is logged off ("offline"). Presence information may also provide more detailed information about the availability of the user. For example, even though a user is online, that user may be away from their computer in a meeting. In such a case, the presence state may indicate "online" and "in a meeting."

In an instant messaging context, a publishing user ("publisher") may provide their presence information to a presence server that then provides the presence information to subscribing users ("subscribers"). Thus, a presence server may use a subscriber/publisher model to provide the presence information for the users of the presence service. Whenever the presence information of a user changes, the presence server is notified of the change by that user's computer system and in turn notifies the subscribing users of the change. A subscribing user can then decide whether to initiate an instant messaging conversation based on the presence information of the intended participants. For example, if the presence information indicates that a publishing user is currently in a conference telephone call, then the subscribing user may decide to send an instant message, rather than place a telephone call, to the publishing user. If the subscribing user, however, needs to call and speak with the publishing user, the subscribing user needs to monitor the presence information of the publishing user to know when the call can be placed. When the subscribing user notices that the publishing user's presence information indicates that the telephone conference has been concluded, the subscribing user can then place the telephone call.

An instant messaging system may allow each user to specify what other users are considered to be "contacts." A contact is typically a person with whom a user has some relationship. For example, the contacts of a user may include all the other users working on the same project, all the users to whom the user has recently sent an instant message, and so on. The instant messaging system may display the current presence state for certain contacts so the user can decide with which contacts to communicate and with which mode of communication as described above. The instant messaging system may display the name of a contact along with an icon that represents the contact's current presence state. For example, the instant messaging system may display a button that is green when the contact is online and a button that is red when the contact is not online.

A difficulty with current techniques for graphically indicating the presence states of contacts is that the graphic indications represent high-level presence states (e.g., online), rather than low-level presence states (e.g., online and in a meeting). An indication of a contact's high-level presence state may not provide a user with enough information to make an informed decision about how best to communicate with the contact. For example, a green button may indicate that the contact is online. The contact could, however, be online and in a meeting, online and at lunch, online and performing some low-priority, interruptible task, and so on. Without knowing the low-level presence state of a contact, a user may attempt to communicate with the contact with a mode of communication that is not appropriate for the contact's current presence state. For example, the user may send an instant message to a contact who is online and making a presentation at a meeting.

SUMMARY

A method and system for indicating availability of a contact is provided. A presence system receives notifications of changes in low-level presence information of contacts. The presence system, upon receiving a notification, identifies a high-level presence state based on the low-level presence state of the contact. The presence system then displays to the user an indication of the high-level presence state in association with the contact. The presence system provides an indication of the availability associated with the low-level presence state of the contact when the user indicates to view such information. When the low-level presence state indicates that the contact is at the more available end of the high-level presence state, the presence system displays an increasing animation to indicate the contact is at the more available end of the high-level presence state. When the low-level presence state indicates that the contact is at the less available end of the high-level presence state, the presence system displays a decreasing animation to indicate that the contact is at the less available end of the high-level presence state. When the user indicates to end viewing such information, the presence system returns to displaying the indication for the high-level presence state.

The presence system may also use increasing and decreasing animation to indicate the availability of a contact without using low-level presence information. When a user indicates to view the availability of a contact, the presence system determines the availability of the contact from the contact's presence information. The availability may be represented by a continuum from low availability to high availability. When the presence information indicates that the contact is at the more available end of the continuum, the presence system displays an increasing animation. When the presence information indicates that the contact is at the less available end of the continuum, the presence system displays a decreasing animation. This allows a user to view the relative availabilities between contacts, rather than the level of availability with a high-level state.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for indicating availability of a contact is provided. In one embodiment, a presence system receives notifications of changes in the low-level presence states of contacts. For example, a user of the presence system may subscribe with a presence server to receive the presence information of several other users or contacts. When the presence state of a contact changes, the presence server notifies the user's presence system of the contact's new presence state. The presence system, upon receiving the new presence information, identifies a high-level presence state based on the low-level presence state of the contact. For example, if the contact has a low-level presence state of online and in a meeting, the high-level presence state may be online. The presence system then displays to the user an indication of the high-level presence state in association with the contact. For example, the presence system may display a green button near the name of the contact when the contact has a high-level presence state of online. The presence system provides an indication of the availability associated with the low-level presence state of the contact when the user indicates to view such information. For example, the user may indicate to view the low-level presence state of a contact by hovering a pointer over the name of the contact. When the low-level presence state indicates that the contact is at the more available end of the high-level presence state (e.g., online and interacting with a low-priority application), the presence system displays an increasing animation to indicate the contact is at the more available end of the high-level presence state. For example, the increasing animation may be the gradual growing of the green button while the pointer hovers over the contact's name. When the low-level presence state indicates that the contact is at the less available end of the high-level presence state (e.g., online and making a presentation), the presence system displays a decreasing animation to indicate that the contact is at the less available end of the high-level presence state. For example, the decreasing animation may be the gradual shrinking of the green button while the pointer hovers over the contact's name. When the user moves the pointer so that it is no longer hovering over the contact's name, the presence system uses a decreasing or increasing animation to restore the indication representing the high-level presence state. The presence system may use various techniques for increasing animation and decreasing animation. For example, the increasing animation may be implemented by increasing the intensity level of a displayed color while the decreasing animation may be implemented by decreasing the intensity level of the displayed color. As another example, the increasing animation may be implemented by increasing the size of the contact's name, while the decreasing animation may be implemented by decreasing the size of the contact's name. In this way, a user who is interested in knowing more detailed information about the availability of a contact can upon request be presented with increasing or decreasing animation to indicate the detailed information on availability.

In one embodiment, the presence system may indicate availability of a low-level presence state within a high-level presence state by increasing or decreasing an indication of the high-level presence state after the presence state of a contact changes. For example, when a contact's presence state is online and in a meeting (i.e., not very available), the presence system may display a small green button near the contact's name. When the contact's presence state changes to online and at an office desk (i.e., very available), the presence system may display a large green button near the contact's name. Alternatively, the presence system may indicate the availability within a high-level presence state by increasing or decreasing the intensity level of a color or the size of the contact's name. The presence system may also animate the increasing and decreasing of the indication so that a sudden increase or decrease in a displayed indication does not distract the user. For example, the presence system may gradually decrease the size of a green button as a contact becomes less available.

The presence system may also indicate the relative availability of a contact within a high-level presence state using increasing animation or decreasing animation. When the low-level presence state changes, the presence system may use increasing animation or decreasing animation to show the transition from the availability of the previous low-level presence state to the availability of the new low-level presence state. The presence system, however, does not stop the animation when the indication of the availability of the new low-level presence state is reached. Rather, the presence system continues the increasing animation or the decreasing animation to provide an indication of the relative availability of the new low-level presence state within the high-level presence state. After stopping the increasing animation or decreasing animation, the presence system then uses decreasing animation or increasing animation to return to the indication for the availability of the new low-level presence state. For example, low-level presence states of a high-level presence state may correspond to availabilities of low, low medium, medium, high medium, and high. When the availability of a contact changes from medium to high medium, the presence system may gradually increase the size of the green button to a size past that which is appropriate for high medium availability to the size appropriate for high availability. The presence system may then gradually reduce the size of the green button to the size appropriate to the high medium availability. The presence system can also use such a technique for showing the relative availability of a contact when a user indicates to view more detailed information about the availability of the contact.

The presence system may represent the presence states as a hierarchy of presence states. Thus, a high-level presence state can be any non-leaf presence state in the hierarchy with its child presence states being the low-level presence states. The presence system displays an indication (e.g., icon) that is appropriate for the high-level presence state to be displayed and using increasing animation or decreasing animation when the user wants to view more detailed presence information. For example, the high-level presence state of a contact may be in a meeting. In such a case, the presence system may display an icon showing people attending a meeting. The low-level presence state for the in a meeting presence state may be making a presentation, participating in the meeting, and interacting with the instant messaging system, which correspond to low, medium, and high availability, respectively. In such a case, when a user hovers a pointer over the name of a contact who is making a presentation, the presence system shrinks the size of the icon showing people attending a meeting.

The presence system may also use increasing and decreasing animation to indicate the availability of a contact without using low-level presence information. When a user indicates to view the availability of a contact, the presence system determines the availability of the contact from the contact's presence information. The availability may be represented by a continuum from low availability to high availability. When the presence information indicates that the contact is at the more available end of the continuum, the presence system displays an increasing animation. When the presence information indicates that the contact is at the less available end of the continuum, the presence system displays a decreasing animation. For example, the presence information may indicate a presence state that may be online, busy, away, or offline, with online representing high availability and offline representing low availability. When a user hovers a pointer over the displayed name of a contact, the presence system may use increasing animation to increase the size of the displayed name when the contact is online and may use decreasing animation to decrease the size of the displayed name when the contact is offline. If names of multiple contacts are displayed, a user can hover the pointer over different names to check the relative availability of contacts. This allows a user to view the relative availabilities between contacts, rather than the level of availability with a high-level state.

The presence system may also use increasing animation and decreasing animation to simultaneously show the availability of multiple contacts. For example, a user may select the name of multiple contacts and then hover a pointer over the selection. In response, the presence system determines the availability of each contact and increases or decreases the size of the displayed names accordingly. The present system may also indicate the availability of contacts by using increasing or decreasing animation on an icon or some other indicator associated with a contact. For example, the presence system may use green, blue, yellow, and red icons to indicate the presence states of online, busy, away, and offline, respectively. When a user hovers a pointer over a blue icon, the presence system may use increasing animation to increase the size of the blue icon. When the user hovers a pointer over a yellow icon, the presence system may use increasing animation to decrease the size of the yellow icon. The use of animation may be especially helpful to a user who does not know the relative availability associated with an icon. For example, a user may not remember that a blue icon represents a higher availability than a yellow icon.

Figure 1:
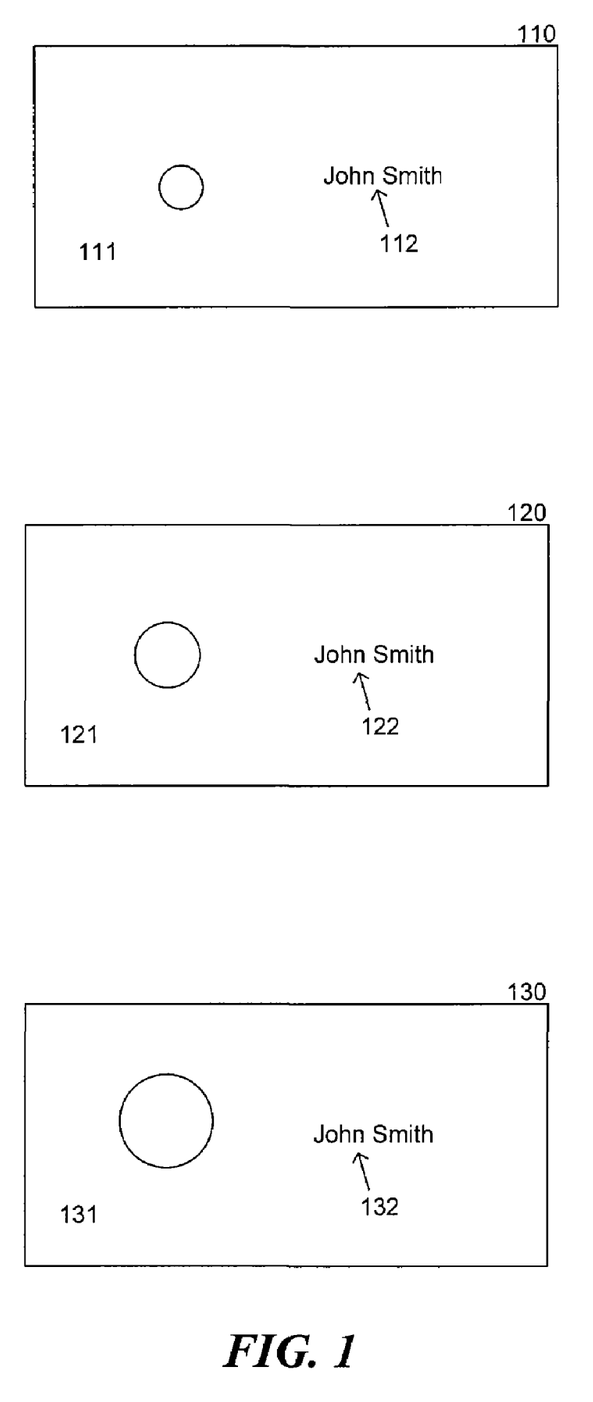
FIG. 1 illustrates increasing animation used to indicate that a contact has a high availability within the high-level presence state in one embodiment.

FIG. 1 illustrates increasing animation used to indicate that a contact has a high availability within the high-level presence state in one embodiment. Illustration 110 shows the high-level presence state for a contact John Smith who currently has a high availability. The illustration includes a medium-size button 111 and the contact's name 112. Illustration 120 shows the increasing of the button size when a user requests to view more detailed availability. When the user moves pointer 122 to hover over the contact's name, the presence system gradually increases the size of the button 121. Illustration 130 shows the final button size as the user continues to hover the pointer over the contact's name. The pointer 132 is still hovering over the contact's name, and the presence system has increased the button 131 to a size that indicates highest availability. When the user moves the pointer so that it is no longer hovering over the contact's name, the presence system gradually decreases the size of the button to its original size at the start of the hovering indicated by button 111.

Figure 2:
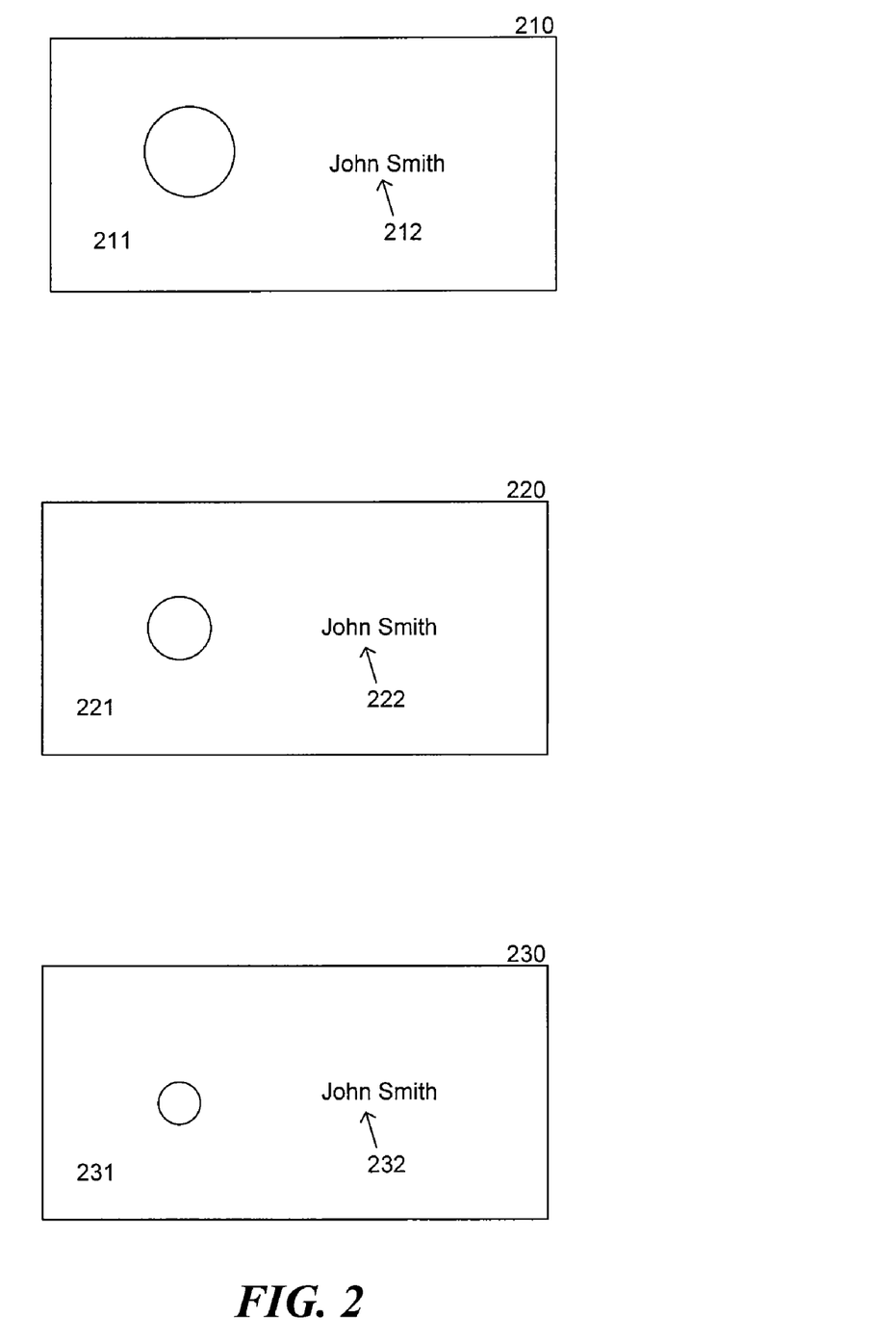
FIG. 2 illustrates decreasing animation used to indicate that a contact has a low availability within the high-level presence state in one embodiment.

FIG. 2 illustrates decreasing animation used to indicate that a contact has a low availability within the high-level presence state in one embodiment. Illustration 210 shows the high-level presence state for a contact John Smith who currently has a low availability. The illustration includes a medium-size button 211 and the contact's name 212. Illustration 220 shows the decreasing of the button size when a user requests to view more detailed availability. When the user moves pointer 222 to hover over the contact's name, the presence system gradually decreases the size of the button 221. Illustration 230 shows the final button size as the user continues to hover the pointer over the contact's name. The pointer 232 is still hovering over the contact's name, and the presence system has decreased the button 231 to the size that indicates lowest availability. When the user moves the pointer so that it is no longer hovering over the contact's name, the presence system gradually increases the size of the button to its original size at the start of the hovering indicated by button 211.

Figure 3:
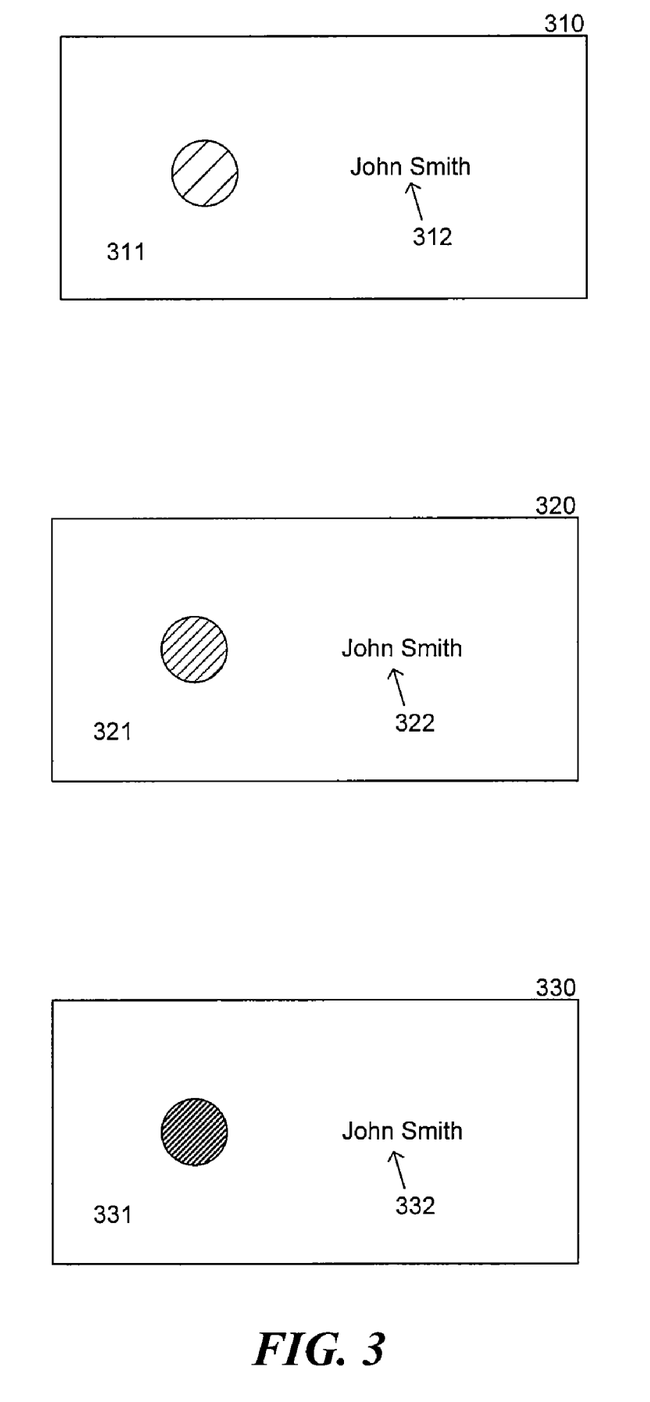
FIG. 3 illustrates increasing intensity level used to indicate that a contact has a high availability within the high-level presence state in one embodiment.

FIG. 3 illustrates increasing intensity level used to indicate that a contact has a high availability within the high-level presence state in one embodiment. Illustration 310 shows the high-level presence state for a contact John Smith who currently has a high availability. The illustration includes a button 311 and the contact's name 312. The button has a color (e.g., green) in normal intensity as indicated by the medium shading. Illustration 320 shows the increasing of intensity level of the color of the button when a user requests to view more detailed availability. When the user moves pointer 322 to hover over the contact's name, the presence system gradually increases the intensity of the color as indicated by the increased shading of button 321. Illustration 330 shows the final intensity level of the color of the button as the user continues to hover the pointer over the contact's name. The pointer 332 is still hovering over the contact's name, and the presence system has increased the intensity level of the color of the button 331 as indicated by the further increased shading to indicate highest availability. When the user moves the pointer so that it is no longer hovering over the contact's name, the presence system gradually decreases the intensity level of the color of the button to its original intensity level at the start of the hovering indicated by button 311.

Figure 4:
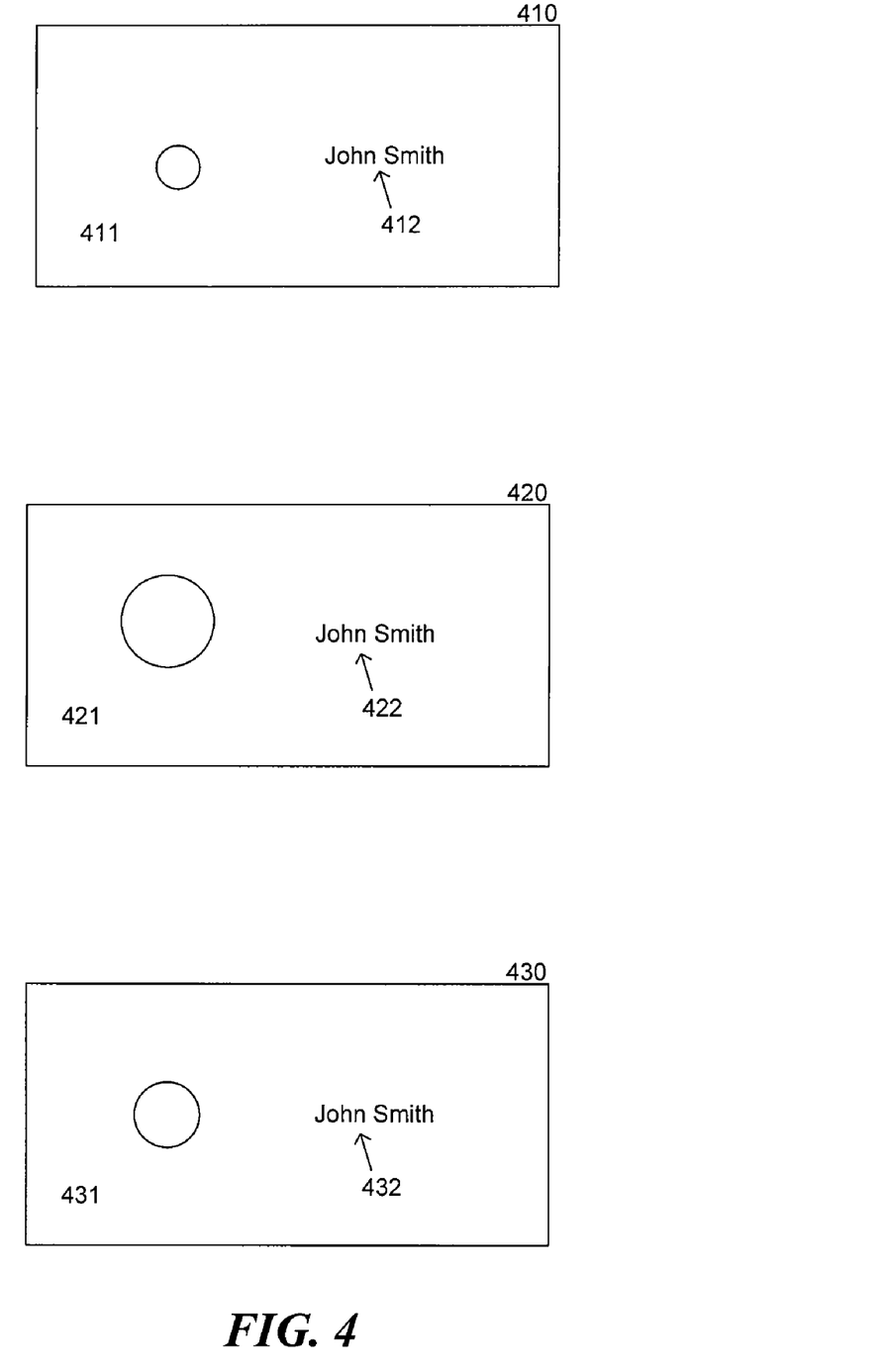
FIG. 4 illustrates animation used to indicate relative availability of a contact who has a new low-level presence state with high medium availability in one embodiment.

FIG. 4 illustrates animation used to indicate relative availability of a contact who has a new low-level presence state with high medium availability in one embodiment. In this illustration, the presence system uses the size of the icon to indicate the availability of the low-level presence state of the contact. Although the indication of availability transitions to a new indication of availability, the new indication is a static representation of the availability of the low-level presence state. In contrast, when a user hovers a pointer over a contact's name as described above, the availability is dynamically displayed. Illustration 410 shows that the current low-level presence state for a contact named John Smith has medium availability. The high-level presence state may be represented by the color, shape, or image of the icon. The illustration includes a button 411 and the contact's name 412. The button has a color (e.g., green) with a medium size. Illustration 420 shows the increasing of the size of the button when the contact's low-level presence state changes to one with high medium availability. When the notification of the change in presence state is received by the user's presence system, the presence system gradually increases the size of the button 421 to a size associated with high availability. Illustration 430 shows the final size of the button. The presence system has decreased the size of the button 431 from the size indicating high availability to its final size indicating high medium availability. Because the presence system grows the button larger than what is required to indicate the high medium availability, the user receives a more prolonged and enhanced visual cue that the contact's availability has increased.

Figure 5:
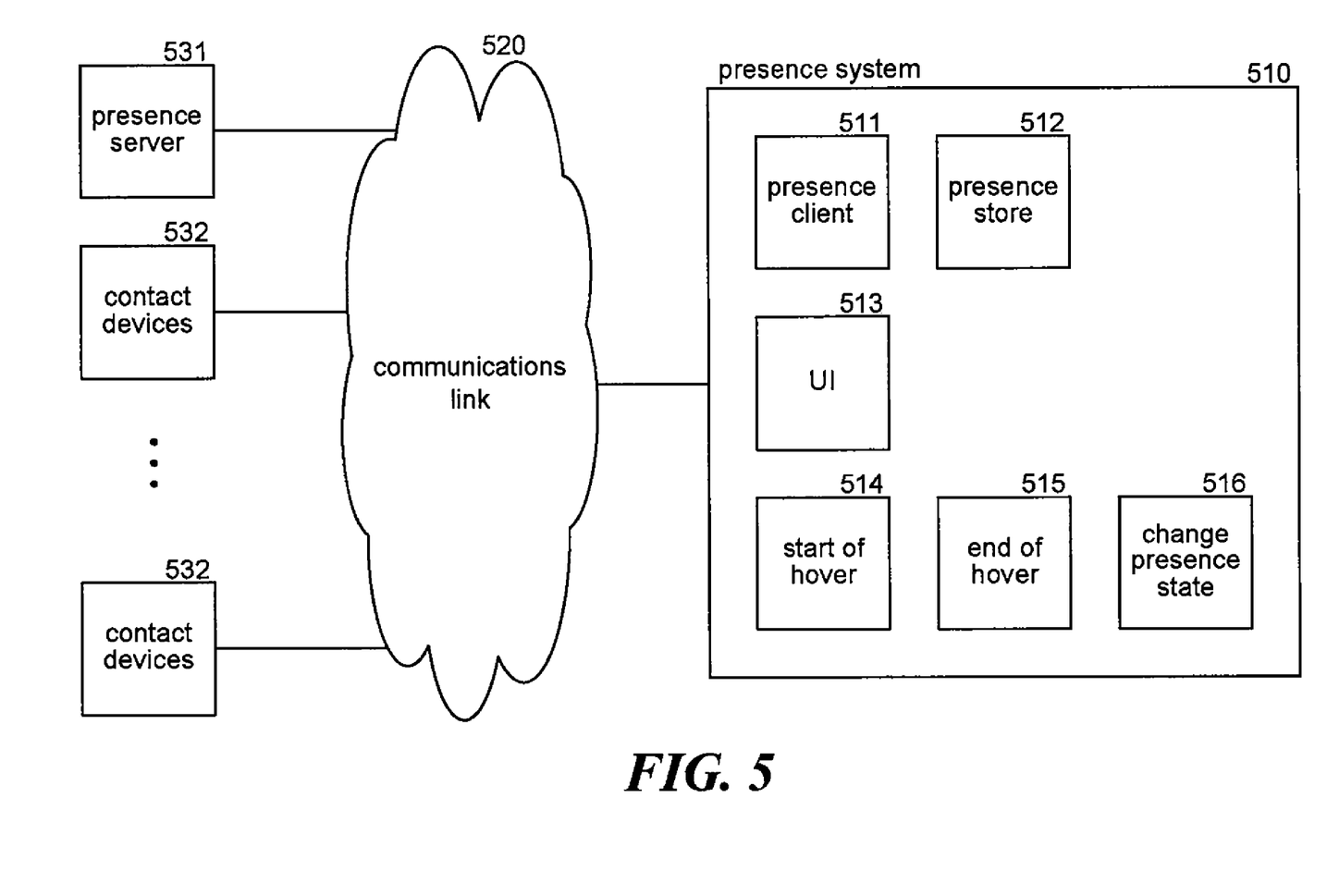
FIG. 5 is a block diagram that illustrates components of the presence system in one embodiment.

FIG. 5 is a block diagram that illustrates components of the presence system in one embodiment. The presence system 510 communicates with a presence server 531 and contact devices 532 via communications link 520. A presence system implemented on a user's computing device includes a presence client 511 and a presence store 512. The presence client interacts with the presence server to subscribe to the presence information of the contacts of the user of the presence system. The presence server receives published presence information from the contact devices and notifies the presence system of the user of changes to the presence information of the contacts. The presence client stores the updated presence information of the contacts in the presence store. The presence system also includes a user interface component 513 that implements the presenting of the presence information of the contacts to the user. The user interface component invokes a start of hover component 514, an end of hover component 515, and a change presence state component 516 to implement the user interface. The start of hover component is invoked when a user starts hovering a pointer over a contact and uses animation to indicate the availability of the contact. The end of hover component is invoked when a user ends hovering a pointer over a contact and ends the animation. The change presence state component is invoked when the presence state of a contact changes and the availability of the contact is to be indicated statically.

The computing device on which the presence system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the presence system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the presence system may be implemented in various operating environments that include personal computers, server computers, hand-held or laptop devices, multiprocessor systems, microprocessor-based systems, programmable consumer electronics, digital cameras, network PCs, minicomputers, mainframe computers, cell phones, personal digital assistants, smart phones, personal computers, programmable consumer electronics, distributed computing environments that include any of the above systems or devices, and so on.

The presence system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the presence system may be implemented on a server, rather than as a presence client on a user's device. In such an implementation, the user's device may be provided with web pages from the server that provides the presence information of the contacts as described above.

Figure 6:
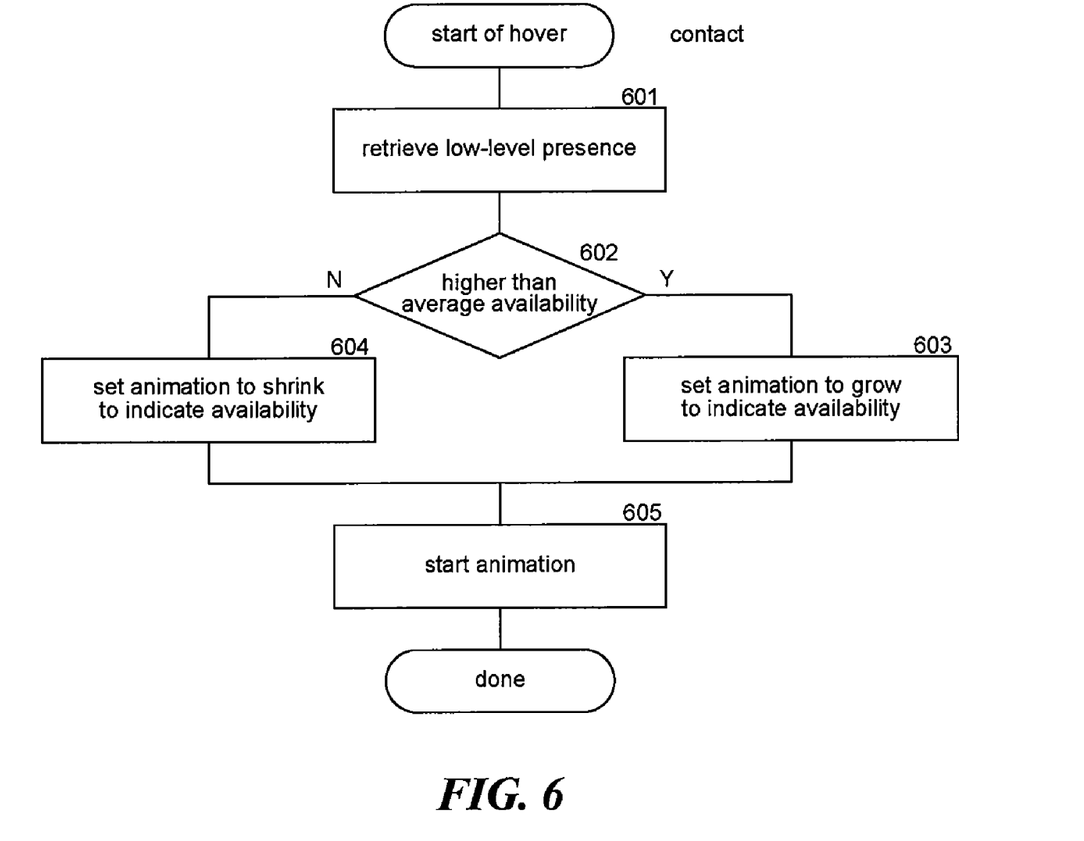
FIG. 6 is a flow diagram that illustrates the processing of the start of hover component of the presence system in one embodiment.

FIG. 6 is a flow diagram that illustrates the processing of the start of hover component of the presence system in one embodiment. The component is invoked by the user interface component when it receives an indication that the user is hovering a pointer over a contact. The component is passed an indication of the contact. In block 601, the component retrieves the low-level presence state of the contact from the presence store. In decision block 602, if the low-level presence state indicates that the user has a higher than average availability, then the component continues at block 603, else the component continues at block 604. In block 603, the component sets the animation to grow the button displayed by the user interface component to indicate the higher than average availability of the contact. In block 604, the component sets the animation to shrink the button displayed by the user interface component to indicate the lower than average availability of the contact. In block 605, the component starts the animation that was set in block 603 or block 604 and then completes.

Figure 7:
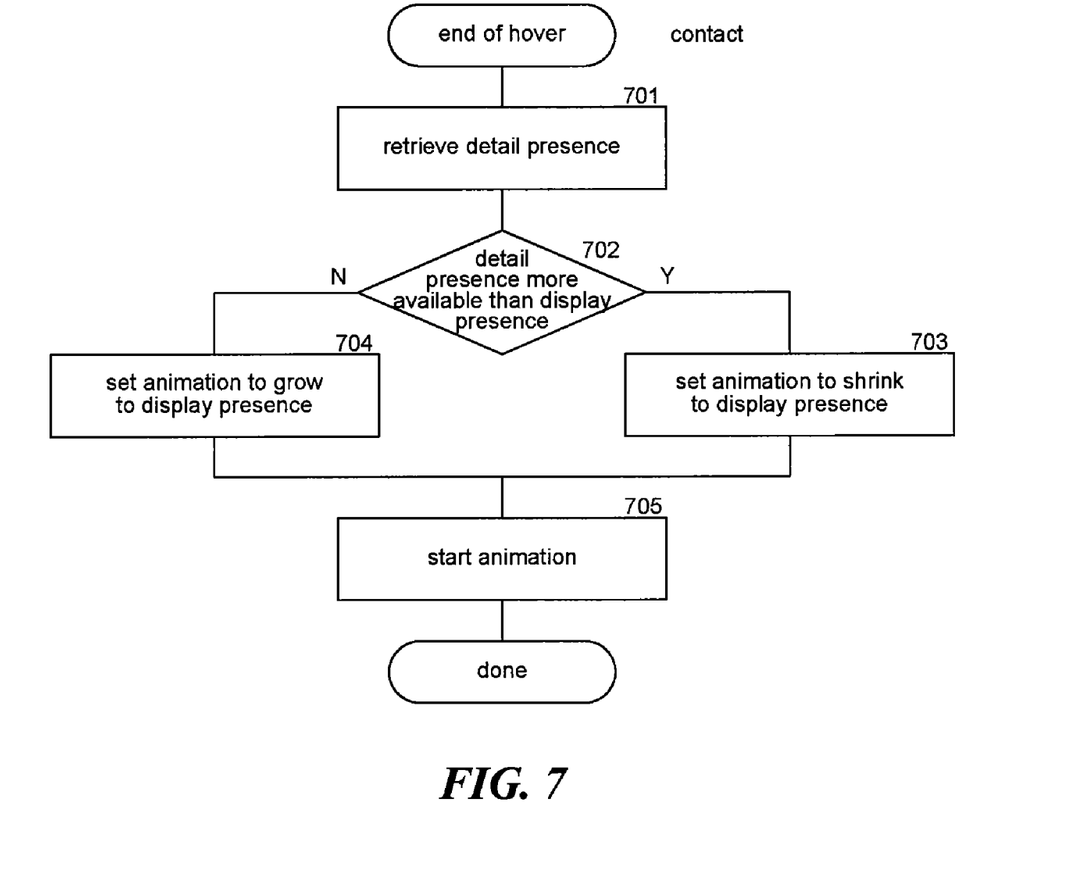
FIG. 7 is a flow diagram that illustrates the processing of the end of hover component of the presence system in one embodiment.

FIG. 7 is a flow diagram that illustrates the processing of the end of hover component of the presence system in one embodiment. The component is invoked by the user interface component when it receives an indication that the user has stopped hovering the pointer over the contact. The component is passed an indication of the contact. In block 701, the component retrieves the low-level presence state of the contact from the presence store. In decision block 702, if the low-level presence state indicates that the user has a higher than average availability, then the component continues at block 703, else the component continues at block 704. In block 703, the component sets the animation to shrink the button displayed by the user interface component to return to the size associated with the normal or average availability of the high-level presence state. In block 704, the component sets the animation to grow the button displayed by the user interface to return to the size associated with the high-level presence state. In block 705, the component starts the animation that was set in block 703 or block 704 and then completes.

Figure 8:
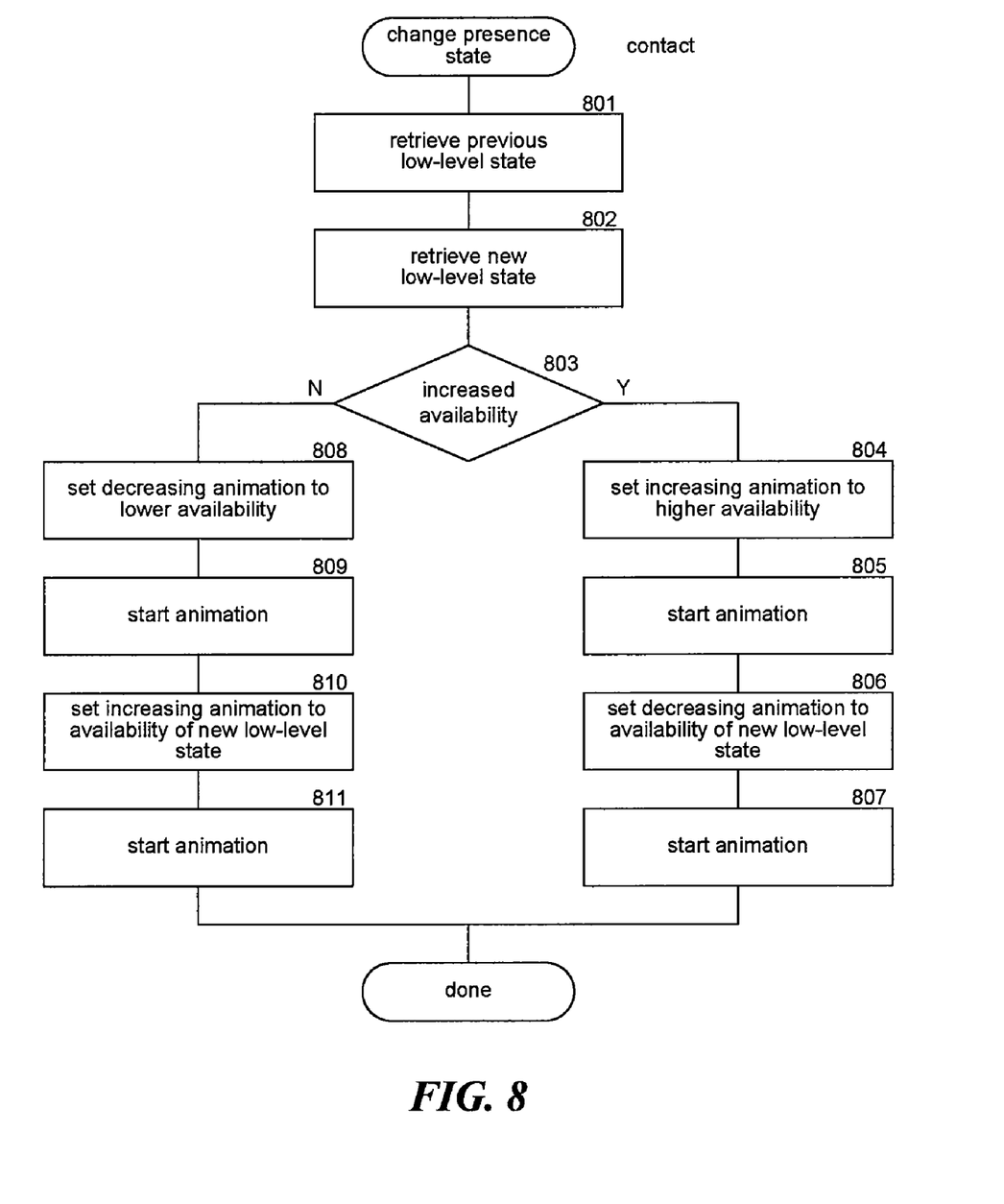
FIG. 8 is a flow diagram that illustrates the processing of the change presence state component of the presence system in one embodiment.

FIG. 8 is a flow diagram that illustrates the processing of the change presence state component of the presence system in one embodiment. The component is invoked when the low-level presence state of a contact changes. When the device of the contact notifies the presence server of the new low-level presence state of the contact, the presence service publishes the new low-level presence state to the subscribing devices. The component is passed an indication of the contact whose low-level presence state has changed. The component uses animation to indicate the relative availability of the new low-level presence state. In block 801, the component retrieves the previous low-level presence state of the contact. In block 802, the component retrieves the new low-level presence state of the contact. In decision block 803, if the new low-level presence state indicates increased availability over the previous low-level presence state, then the component continues at block 804, else the component continues at block 808. In blocks 804-807, the component displays animation indicating the relative availability of the increased availability. In block 804, the component sets an increasing animation to indicate a higher availability than that of the new low-level presence state. In block 805, the component starts the increasing animation. In block 806, the component sets a decreasing animation to indicate the availability associated with the new low-level presence state. In block 807, the component starts the decreasing animation and then completes. In blocks 808-811, the component displays animation indicating the relative availability of the decreased availability. In block 808, the component sets a decreasing animation to indicate a lower availability than that of the new-low level presence state. In block 809, the component starts a decreasing animation. In block 810, the component sets an increasing animation to indicate the availability of the new low-level presence state. In block 811, the component starts the increasing animation and then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computing device for indicating presence information, the computing device having a processor and a memory coupled to the processor, the method comprising:

providing a hierarchy of presence states such that a non-leaf presence state is a high-level presence state with its child presence states being low-level presence states of that high-level presence state, each low-level presence state of a high-level presence state having an associated availability indicating availability of a contact who is in that low-level presence state, the availabilities being along a continuum of availability associated with the high-level presence state, wherein the availabilities include low, low medium, medium, medium high, and high;

receiving an indication of a first low-level presence state of a contact;

determining a high-level presence state associated with the first low-level presence state, wherein the contact is in the first low-level presence state of the contact and the high-level presence state of the contact simultaneously, the high-level presence state having an associated icon and a plurality of associated and distinct low-level presence states, including the first low-level presence state, each of the plurality of low-level presence states having an associated availability;

displaying the icon associated with the high-level presence state for the contact without regard to the low-level presence state of the contact; and when a user indicates to view availability of the contact in the high-level presence state,
determining an average availability of the plurality of low-level presence states associated with the high-level presence state,
when the first low-level presence state has an associated availability that is greater than the determined average availability along the continuum of availability, displaying an increasing animation to indicate that the availability associated with the first low-level presence state is greater than the determined average availability along the continuum of availability, and
when the first low-level presence state has an associated availability that is less than the determined average availability along the continuum of availability, displaying a decreasing animation to indicate that the availability associated with the first low-level presence state is less than the determined average availability along the continuum of availability wherein the receiving, determining, and displaying are performed by the processor executing instructions stored in the memory.

2. The method of claim 1 wherein the animation is the increasing or decreasing of the displayed icon associated with the high-level presence state of the contact.

3. The method of claim 1 wherein the increasing animation is the growing in size of the displayed icon associated with the high-level presence state and the decreasing animation is the shrinking in size of the displayed icon associated with the high-level presence state of the contact.

4. The method of claim 1 wherein the increasing animation and the decreasing animation are effected by changing a color of the displayed icon associated with the high-level presence state of the contact.

5. The method of claim 1 wherein the increasing animation and the decreasing animation are effected by changing an intensity level of a color of the displayed icon associated with the high-level presence state of the contact.

6. The method of claim 1 wherein the user indicates to view availability of a contact by hovering a pointer over the displayed icon associated with the high-level presence state of the contact.

7. The method of claim 6 wherein when the user ends hovering the pointer over the displayed icon associated with the high-level presence state of the contact, displaying an animation to return the icon associated with the high-level presence state of the contact back to that of the high-level presence state.

8. The method of claim 1 wherein the displaying of the icon associated with the high-level presence state of the contact includes displaying an icon indicating the presence state along with a name of the contact, wherein the increasing animation is the growing in size of the displayed icon and the decreasing animation is the shrinking in size of the displayed icon, and wherein the user indicates to view contact availability by hovering a pointer over the displayed name of the contact.

9. A computer-readable storage medium encoded with computer-executable instructions for controlling a computing device having a memory and a processor to indicate availability of contacts, by a method comprising:

providing a hierarchy of presence states such that a non-leaf presence state is a high-level presence state with its child presence states being low-level presence states of that high-level presence state, each low-level presence state of a high-level presence state having an associated availability indicating availability of a contact who is in that low-level presence state;

displaying a first indication of a first high-level presence state for a first contact, the first high-level presence state having a first plurality of associated low-level presence states, the first contact being in a low-level presence state of the first plurality of associated low-level presence states;

displaying a second indication of a second high-level presence state for a second contact, the second high-level presence state having a second plurality of associated low-level presence states, the second contact being in a low-level presence state of the second plurality of associated low-level presence states, wherein the first high-level presence state is different from the second high-level presence state and each of the first plurality of low-level presence states is different from each of the second plurality of low-level presence states;

after the low-level presence state of the first contact changes to indicate that the first contact has become more available in the first high-level presence state, displaying a larger indication to indicate that the first contact is more available;

after the low-level presence state of the first contact changes to indicate that the first contact has become less available in the first high-level presence state, displaying a smaller indication to indicate that the first contact is less available;

after the low-level presence state of the second contact changes to indicate that the second contact has become more available in the second high-level presence state, displaying a larger indication to indicate that the second contact is more available; and after the low-level presence state of the second contact changes to indicate that the second contact has become less available in the second high-level presence state, displaying a smaller indication to indicate that the second contact is less available.

10. The computer-readable storage medium of claim 9 wherein the displaying of the indication of the presence state includes displaying an icon indicating the presence state along with a name of the contact.

11. The computer-readable storage medium of claim 10 wherein the larger indication and the smaller indication are different sizes of the displayed icon.

12. The computer-readable storage medium of claim 10 wherein the larger indication and the smaller indication are different sizes of a displayed name of the contact.

13. The computer-readable storage medium of claim 9 wherein the displaying of the larger indication and the smaller indication occurs when the user hovers a pointer over the displayed indication.

14. The computer-readable storage medium of claim 9 wherein the displaying of the larger indication and the smaller indication occurs when the change occurs.

15. A computing device having a processor and a memory for indicating availability of a contact, the computing device comprising:

a hierarchy of presence states such that a non-leaf presence state is a high-level presence state with its child presence states being low-level presence states of that high-level presence state, each low-level presence state of a high-level presence state having an associated availability indicating availability of a contact who is in that low-level presence state, the availabilities being along a continuum of availability associated with the high-level presence state;

a presence store that stores a high-level presence state and a low-level presence state of a contact;

a component that displays an indication of the contact; and a component that, when a user indicates to view availability of the contact, retrieves the high-level presence state and the low-level presence state of the contact from the presence store, determines an average availability along the continuum of availability associated with the high-level presence state of the contact, when the low-level presence state of the contact indicates that the contact has an availability that is higher than the determined average availability, displays an increasing animation to indicate that the contact has higher than average availability, and when the low-level presence state of the contact indicates that the contact has an availability that is lower than the determined average availability, displays a decreasing animation to indicate that the contact has lower than average availability wherein the components are stored as instructions for execution by the processor.

16. The computing device of claim 15 wherein the indication of the presence state includes an icon indicating the presence state of the contact.

17. The computing device of claim 16 wherein the animation is the increasing or decreasing of the displayed icon.

18. The computing device of claim 15 wherein the user indicates to view availability of the contact by hovering a pointer over the displayed indication.

19. The computing device of claim 15 wherein the indication of the presence state is the name of the contact.

* * * * *